June 14, 1960 J. E. VOLKMANN 2,941,044

CONTROLLED SOUND REPRODUCTION

Filed April 23, 1954

3 Sheets-Sheet 1

INVENTOR.
John E. Volkmann
BY [signature]
ATTORNEY.

INVENTOR.
John E. Volkmann
BY [signature]
ATTORNEY.

June 14, 1960 J. E. VOLKMANN 2,941,044

CONTROLLED SOUND REPRODUCTION

Filed April 23, 1954 3 Sheets-Sheet 3

INVENTOR.
John E. Volkmann
BY [signature]
ATTORNEY.

2,941,044

CONTROLLED SOUND REPRODUCTION

John E. Volkmann, Haddon Heights, N.J., assignor to Radio Corporation of America, a corporation of Delaware Filed Apr. 23, 1954, Ser. No. 425,103
7 Claims. (Cl. 179—100.1)

This invention relates to sound reproducing systems, and particularly to a stereophonic, directional, and special sound effects system for use with peripheral vision and/or stereoscopic picture presentations.

In my co-pending U.S. application, Ser. No. 408,139, filed February 4, 1954, I disclose and claim a single film stereoscopic picture system which may be used to present two-dimensional pictures, three-dimensional pictures, and peripheral vision pictures, or combinations thereof. In this co-pending application, a film is disclosed, on which one to five signal tracks are provided, two of the multiple tracks being preferably photographic in the normal picture area for thirty-five millimeter film, along with two magnetic tracks along the outer edges of the film and one between the sprocket holes and pictures on the film, and a control track in the longitudinal areas between one or both rows of sprocket holes. The present invention relates to sound systems for utilizng two or more of these and/or additional tracks, as may be desired, to obtain special sound effects, depending upon the theater equipment available.

The principal object of the present invention, therefore, is to facilitate the reproduction of sound for motion pictures.

Another object of the present invention is to provide a multi-track motion picture film system for presenting special sound effects.

A further object of the present invention is to provide an improved multiple track reproducing system for motion pictures in two-dimensional, three-dimensional, and peripheral vision, or combinations thereof.

The novel features which are believed to be characteristic of this invention, both as to the manner of its organization and the mode of its operation, will be better understood from the following description, when read in conjunction with the accompanying drawings, in which.

Figure 1:
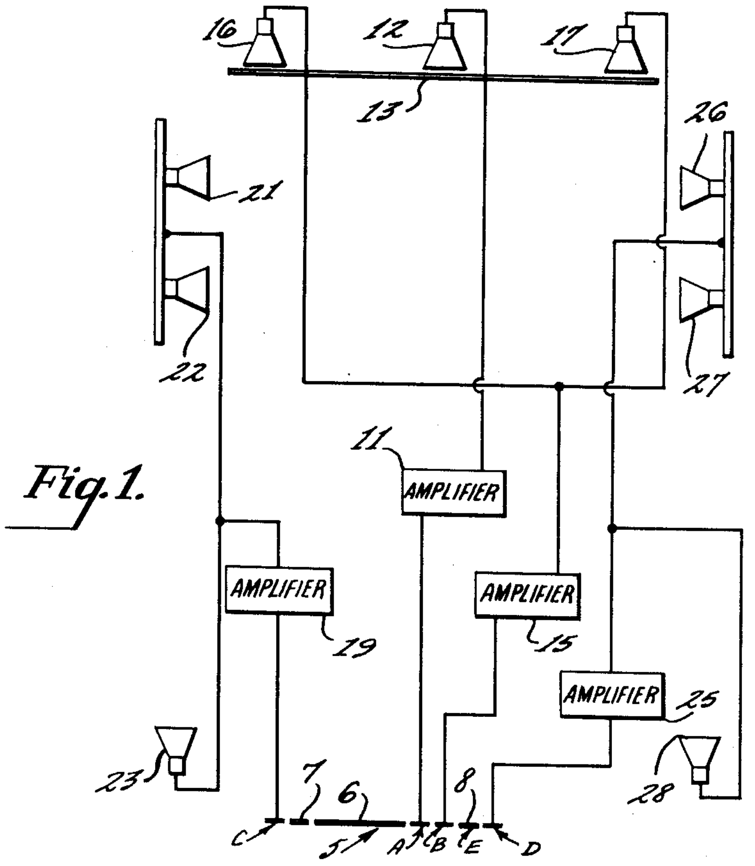
Fig. 1 is a single line view of a mutliple channel sound system using four sound tracks according to my present invention.

Referring, now, to Fig. 1, a picture film 5, such as shown in my above mentioned co-pending application, has a picture area 6, rows of sprocket holes 7 and 8, two photographic sound tracks A and B (which, instead, could be magnetic, but which are referred to hereinafter as "photographic" merely for the sake of convenience in designation or identification), two magnetic sound tracks C and D along the edges of the film, and a control track E in the longitudinal areas between the row of sprocket holes 8. A control track could also be positioned between the sprocket holes 7. The sound track A, which may contain the dialogue at a high level and music and sound effects at a lower level, is connected to an amplifier 11 feeding a loudspeaker 12 centrally located with respect to a screen 13 and adjusted for best reproduction and distribution of voice. The music and sound effects track B is connected to an amplifier 15 feeding speakers 16 and 17 at the sides of the screen 13 and adjusted for best reproduction and distribution of music and sound effects. Magnetic sound track C is connected to an amplifier 19 feeding side speakers 21 and 22 located at the left side of the auditorium and a speaker 23 at the rear of the auditorium. Magnetic sound track D is connected to an amplifier 25 feeding speakers 26 and 27 positioned at the right side of the auditorium and a speaker 28 at the rear of the auditorium.

There are thus provided four separate and distinct sound reproducing channels which may provide stereophonic, directional, or special sound effects as desired. For instance, the directional sound may be obtained by use of all the speakers, whereby the sound source may be indicated as moving generally from the left-hand to the right-hand side of the screen. In this case, the sound volume varies from speakers 23, 22, and 21, to speakers 16, 12, and 17, and then to speakers 26, 27, and 28. The source of sound shown leaving or approaching may also have the levels in speakers 16, 12, and 17 varied to indicate the moving sound source on screen 13.

Figure 2:
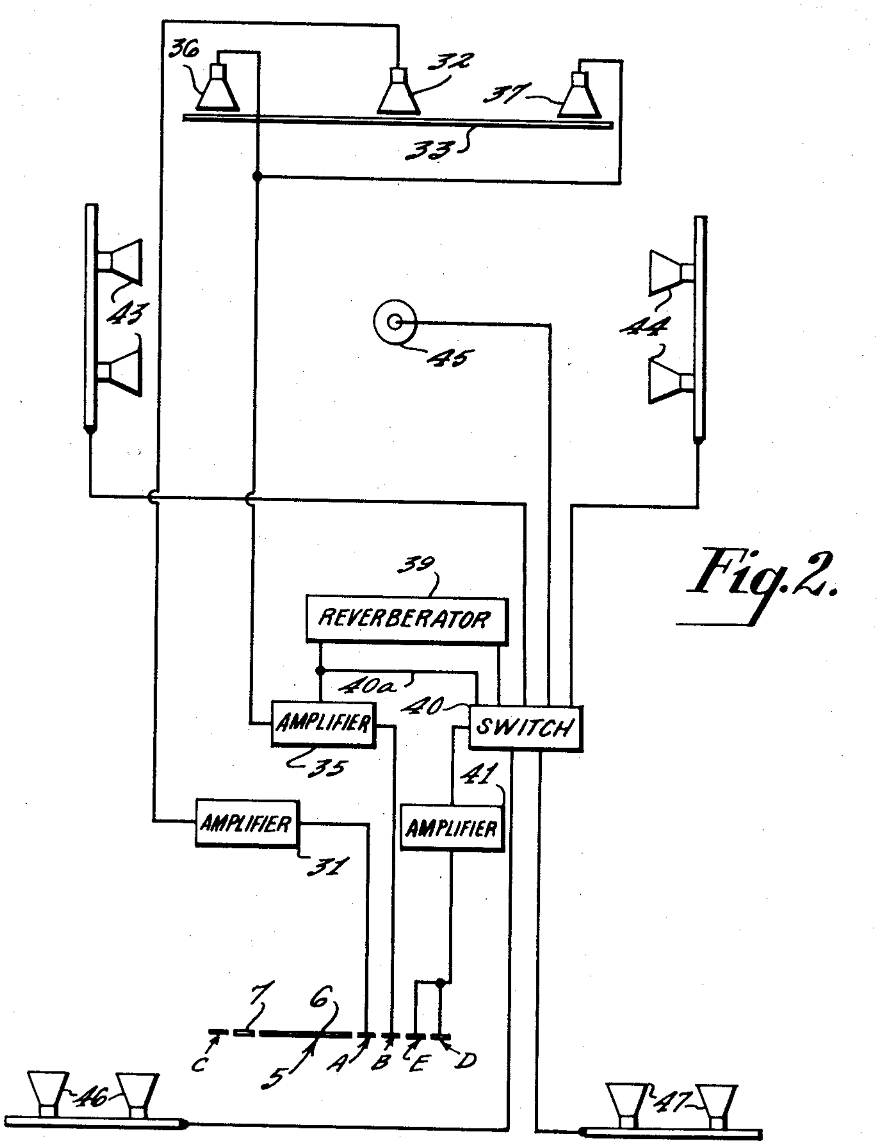
Fig. 2 is a single line view of a multiple channel sound system using two sound tracks and a control track according to this invention.

Referring now to Fig. 2, the same sound film 5 with its multiple tracks makes use of only the two photographic tracks A and B, which are controlled by control track E. In this instance, the dialogue track A is connected to an amplifier 31 and feeds a speaker 32 centrally located behind a screen 33. The music and sound effects track B is connected to an amplifier 35, which is connected to speakers 36 and 37 at the respective sides of the screen. Part of the signal from amplifier 35 is also fed to a reverberator 39 to obtain reverberation, and then to a switch 40 of any standard type or as disclosed in Kellogg U.S. Patent No. 2,499,587 of March 7, 1950. The switch 40 is connected over amplifier 41 to the control track E in one sprocket hole area of the film 5. The control track may be of the type shown in Burrill U.S. Patents No. 2,270,260 and No. 2,270,261 of January 20, 1942. The control track can shift the sound among several speakers, such as left-hand side speakers 43 and right-hand side speakers 44, a speaker 45 located above the auditorium, and speakers 46 and 47 at the rear of the auditorium. The switch 40 may also respond to the control track E to couple directly to the amplifier 35 through a lead 40*a* and at the same time disconnect the reverberator 39. Thus, with the control track switching system, the music and sound effects from the photographic track B may be shifted about the auditorium to provide any directional or special sound effects desired.

Figure 3:
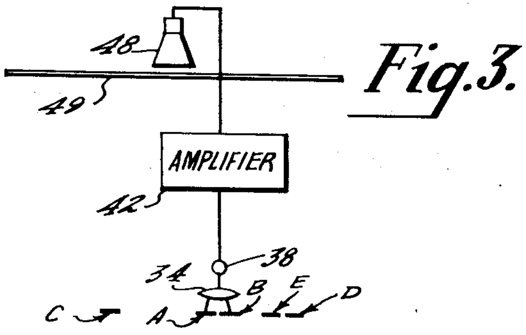
Fig. 3 is a single line view of a single channel sound system using two tracks according to this invention.

Referring now to Fig. 3, a single channel using two tracks is shown, such a system being usable in theaters having only a single projector. In this system, tracks A and B, which contain dialogue, music, and sound effects, as mentioned above, are simultaneously scanned and projected by a lens 34 to a photocell 38. Cell 38 is connected to an amplifier 42 feeding a speaker 48 behind a screen 49. If the tracks A and B were magnetic tracks, a single magnetic reproduce head would be used as the transducer.

Figure 4:
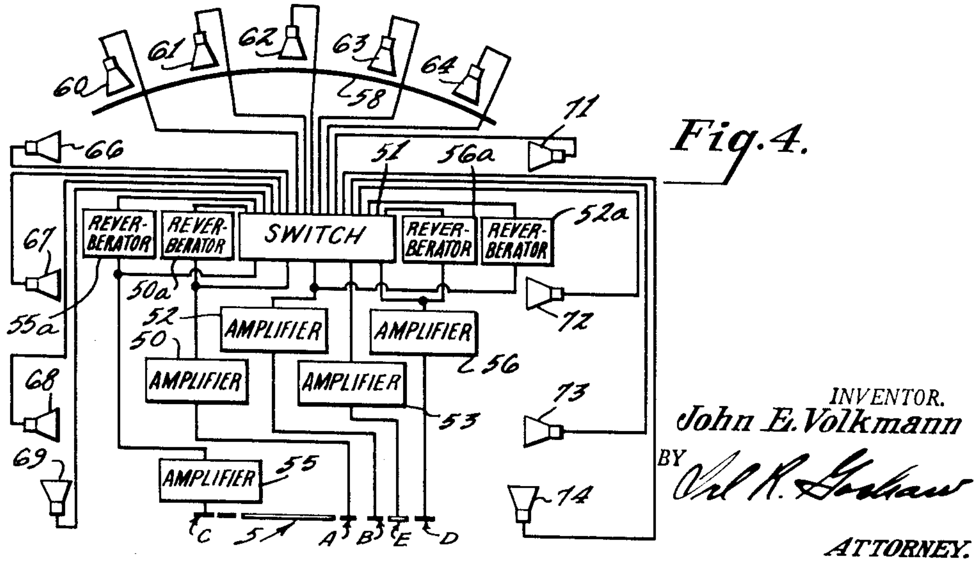
Fig. 4 is a single line view of a multiple track system using four sound tracks and a control track according to my present invention.

Referring now to Fig. 4, a system is shown using all of the tracks provided on the film 5. In this system, dialogue track A is amplified in an amplifier 50 and fed to a switch 51. The music and sound effects track B is also fed to the switch 51 through an amplifier 52. The control track E is fed to the switch 51 over an amplifier 23. The two magnetic tracks C and D are fed to the switch 51 respectively over amplifiers 55 and 56. In this modification, a plurality of speakers 60, 61, 62, 63, and 64 is provided behind a curved screen 58. There is also provided left-hand side speakers 66, 67, and 68 with a rear speaker 69. On the right-hand side of the auditorium, speakers 71, 72, and 73 are used with a rear speaker 74. Such a multiple speaker system is particularly adaptable for presenting a "Cinerama" type of picture presentation which utilizes the principle of peripheral vision. Through the switch 51, the control track may be used to switch the dialogue and music and sound effects among the speakers to follow the source of sound being depicted on the screen 58 and provide special sound effects required by the scene being viewed. The system, therefore, provides peripheral vision with its spatial width and stereoscopic vision with its spatial depth, or a combination of both, together with directional and stereophonic sound effects. If desired, parts of the signals from the amplifiers 55, 50, 52, and 56 may be fed, respectively, to reverberators **55*a*, 50*a*, 52*a*, and 56*a*** to obtain reverberation effects.

Figure 5:
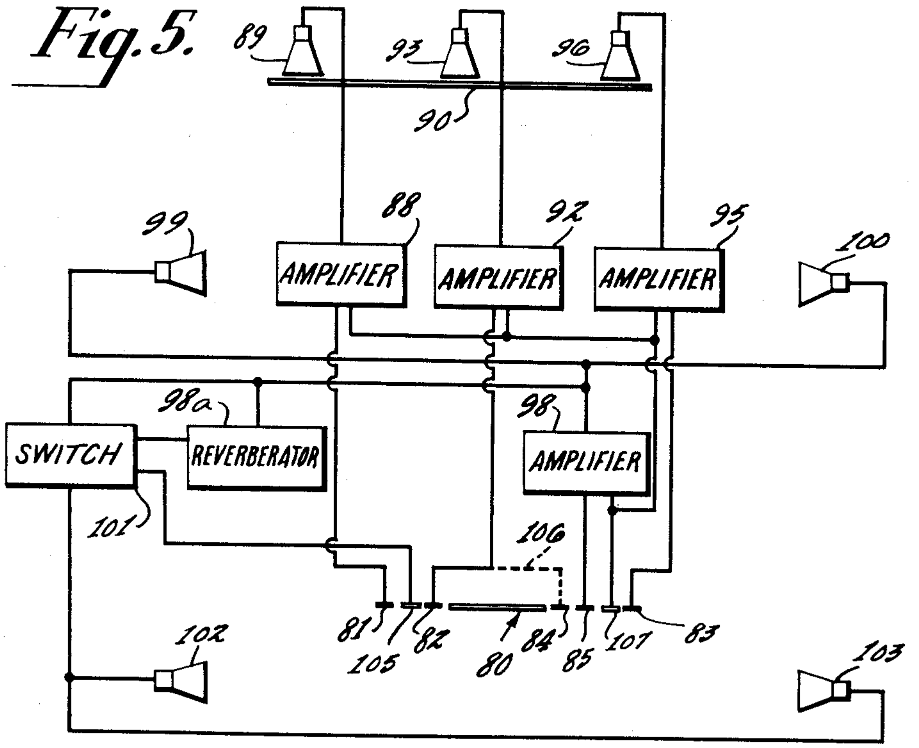
Fig. 5 is a single line view of a multiple track system using a control track in accordance with the instant invention.

Referring now to Fig. 5, the film 80 has thereon three magnetic tracks 81, 82, and 83 and two photographic tracks 84 and 85. This film differs from the film 5, shown in the prior figures, by an additional magnetic track, such as the track 82, the film 80, therefore, being adapted to provide sound for substantially all present-day theater installations from a single channel system to stereophonic and wide sound distribution systems.

To provide a straight or normal stereophonic system, the magnetic tracks 81, 82, and 83 are employed. The track 81 is connected over an amplifier 88 to a speaker 89 behind the left-hand portion of a screen 90. The magnetic track 82 is connected over an amplifier 92 to a speaker 93 positioned behind the central portion of the screen 90. The magnetic track 83 is connected over an amplifier 95 to a speaker 96 on the right-hand side of the screen 90. Thus, with the three magnetic tracks 81, 82, and 83 recorded stereophonically and the theater provided with a magnetic sound pickup system, the three channels just described will afford a stereophonic and directional sound distribution.

The photographic track 84 may be a composite of the signals from the three magnetic tracks 81, 82, and 83, or may be a composite of all signals of the usual type now provided for a release print, while the photographic track 85 contains special effect signals. The track 85 is connected over an amplifier 98 to side auditorium speakers 99 and 100 and also, either directly or through a reverberator **98*a*, to a switch 101, which is connected to rear corner speakers 102 and 103. The special effects track 85, therefore, may be used to provide the directional sound or enhanced stereophonic sound by reproduction thereof either at the side speakers 99 and 100, but also by speakers 102 and 103, either with or without reverberation, when the switch 101 is actuated by sprocket hole control track 105. This arrangement, therefore, of the stereophonic magnetic tracks 81, 82, and 83, special effects track 85, and the control track 105 will provide complete audio sound perspective in all its phases. By dotted line 106, the composite photographic track 84 is shown connected to amplifier 92, which is connected to the central speaker 93. This track 84 is provided for safety purposes and, should failure occur in the stereophonic sound channels, this composite track will be connected to the central speaker and provide the desired sound in the manner of a present-day picture and sound presentation. Also, in theaters having only one operating channel, the composite track 84 may be used by itself or scanned in conjunction with track 85. Also installations having two channels, the composite track 84 and the effects track 85 may be used on separate channels or scanned jointly for emergency purposes on either channel. Thus, the system shown in Fig. 5 using five sound tracks and a control track is for universal use and will provide any desired sound presentation in all theaters. If desired, the film 80 may also be provided with a control track 107, which may be connected to one or more of the amplifiers 88, 92, 95, and 98 to control the gain of these amplifiers. For this purpose, the track 107** may have a plurality of code signals, each of a different frequency and each associated with a different one of the amplifiers.

Figure 6:
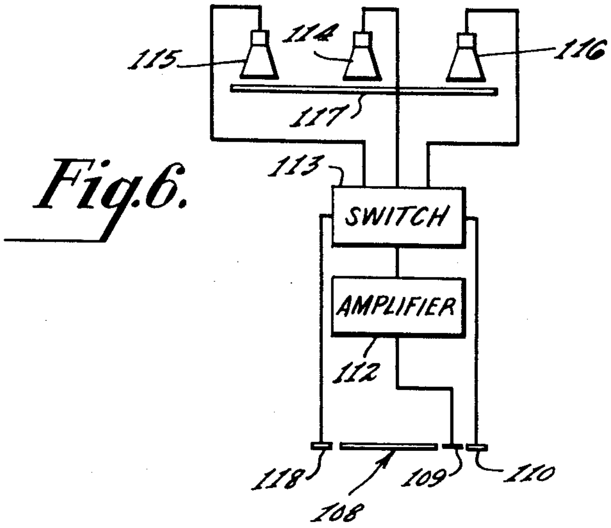
Fig. 6 is a single line view of a single track system using a control track for switching the tracks among several speakers in accordance with my present invention.

Referring now to Fig. 6, a system is shown which has a film 108 provided with only one composite track 109 and one or more sprocket hole control tracks 110 and 118. The signal track 109 may include two separate tracks corresponding to the tracks A and B of Fig. 3, and is connected through an amplifier 112 to a switch 113. The switch 113 is connected to a central speaker 114 and respective left-hand and right-hand side speakers 115 and 116 behind a screen 117, and may incorporate electronic gain in addition to its switching function. The control tracks 110 and 118 are connected to the switch 113, and, through a series of code signals, will shift the sound source among the three speakers 114, 115, and 116 to provide stereophonic and directional sound effects. If desired, the control track 110 may be associated primarily with the right-hand speaker 116 alone or the speakers 114 and 116, while the control track 118 may be used to control primarily the left-hand speaker 115 alone or the speakers 114 and 115. Thus, with films now in existence, the sound system of Fig. 6 will permit sound distribution behind the screen in accordance with the sound source depicted on the screen.

The above six systems, therefore, provide for complete flexibility in presenting sound in association with the picture, depending upon the number of sound control tracks on the release print.

I claim:

1. A multiple speaker spatial sound system for a listening area to reproduce sound from a record medium having a plurality of signal tracks thereon comprising loudspeakers spatially disposed within said area, means for reproducing one of said tracks with certain speakers within said area, means for reproducing another of said tracks with certain speakers within said area, means for reproducing another of said tracks with certain speakers within said area, means for switching any one of said tracks to any one of said speakers, and means for modifying the characteristics of the sound from any one of said tracks.

2. A multiple speaker spatial sound system in accordance with claim 1 in which two of said tracks are photographic, two of said tracks are magnetic, and said last-mentioned means is a sound reverberator.

3. A stereophonic sound reproducing system for an auditorium to reproduce sound from a film having a pair of sound tracks and a control track thereon comprising a centrally located speaker, speakers located at the sides of said centrally located speaker, speakers located on both sides of said side speakers, means for reproducing one of said tracks in said centrally located speaker, means for reproducing the other of said tracks in said speakers at the sides of said centrally located speaker, means for reproducing said control track, a switch connected to said control track and to said means for reproducing said second mentioned track, and means for connecting said side speakers to said switch, said control track being adapted to actuate said switch to shift the reproduction of said second mentioned track to any one of said speakers.

4. A stereophonic sound reproducing system in accordance with claim 3 in which additional speakers are provided, together with means for connecting said last mentioned speakers to said switch for distributing said second mentioned track to any one of said last mentioned speakers.

5. A stereophonic sound reproducing system in accordance with claim 3 in which at least one speaker is provided above said other speakers, together with means for connecting said last mentioned speaker with said switch.

6. A stereophonic sound reproducing system in accordance with claim 3 in which said last mentioned means is a reverberator connected to said means for reproducing said sound tracks and to said switch for reverberating the signals in said sound tracks.

7. A panoramic sound system for an auditorium to reproduce sound from a film having a plurality of sound tracks and a control track thereon comprising a plurality of speakers in front of and along the sides and rear of said auditorium, a switch, means for connecting said switch to said speakers, means for individually reproducing the signals on said sound tracks, means for impressing said signals on said switch, said switch shifting said signals from any one of said tracks among said speakers according to the signal on said control track and means for modifying the characteristics of said reproduced sound.

References Cited in the file of this patent

UNITED STATES PATENTS

| | | |
|---|---|---|
| 1,901,033 | Karolus | Mar. 14, 1933 |
| 1,950,690 | Owens | Mar. 13, 1934 |
| 2,008,712 | Hammond | July 23, 1935 |
| 2,101,121 | Wixon | Dec. 7, 1937 |
| 2,298,618 | Garity et al. | Oct. 13, 1942 |
| 2,673,248 | Hamberg | Mar. 23, 1954 |
| 2,709,204 | Holmes | May 24, 1955 |
| 2,714,633 | Fine | Aug. 2, 1955 |
| 2,778,874 | Mueller | Jan. 22, 1957 |

FOREIGN PATENTS

| | | |
|---|---|---|
| 342,284 | Great Britain | Feb. 26, 1931 |

OTHER REFERENCES

Stereophonic Sound (Watkins), British Kinematography, vol. 24, No. 3, pp. 64–71, March 1954.